R. L. WILCOX & C. O. PETITJEAN.
MACHINE FOR TRIMMING BLANKS.
APPLICATION FILED MAR. 28, 1918

1,294,993.

Patented Feb. 18, 1919.
6 SHEETS—SHEET 1.

INVENTORS:
Richard Lester Wilcox
and Clifford O. Petitjean,
BY
George Estall
ATTORNEY

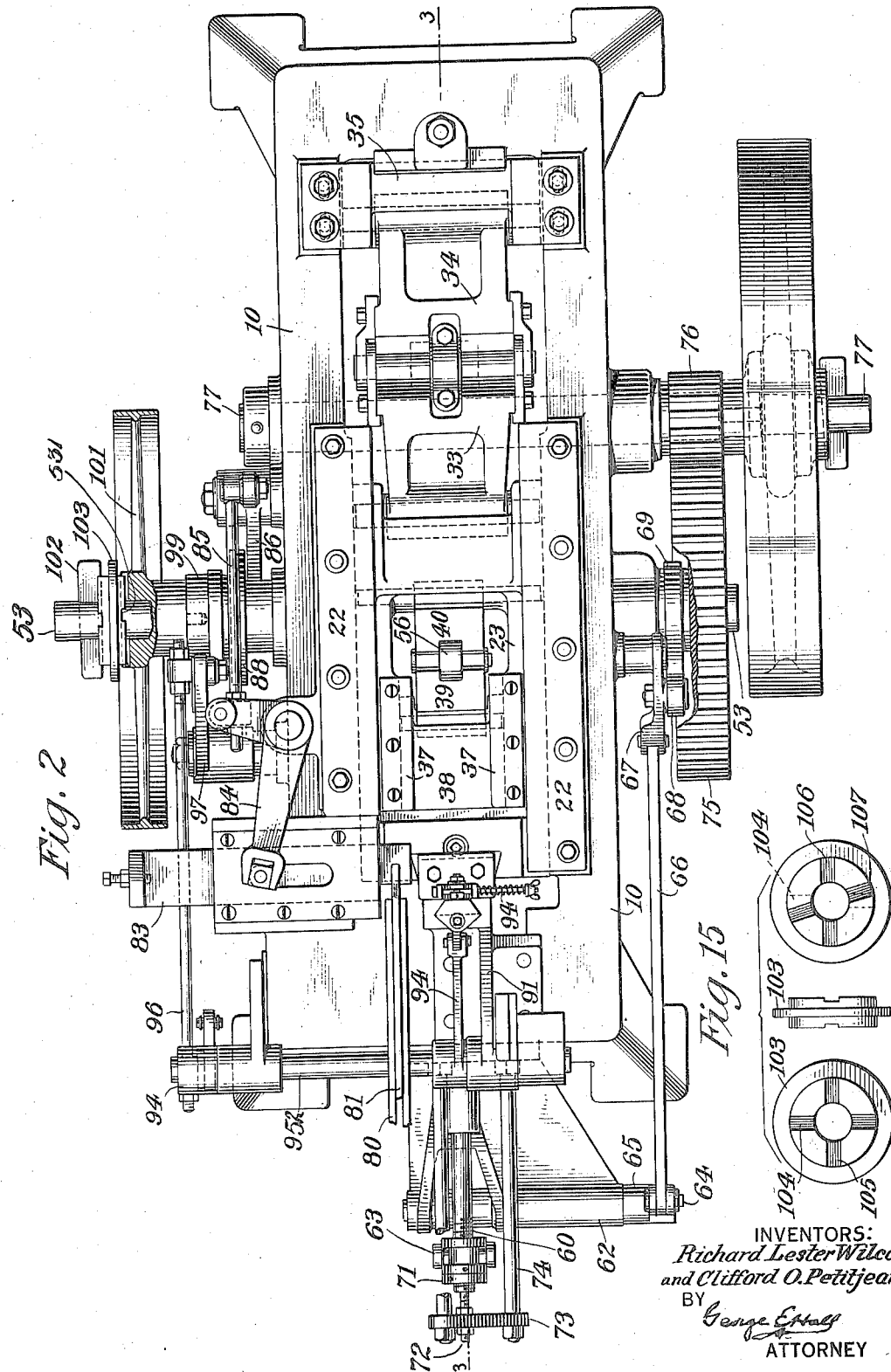

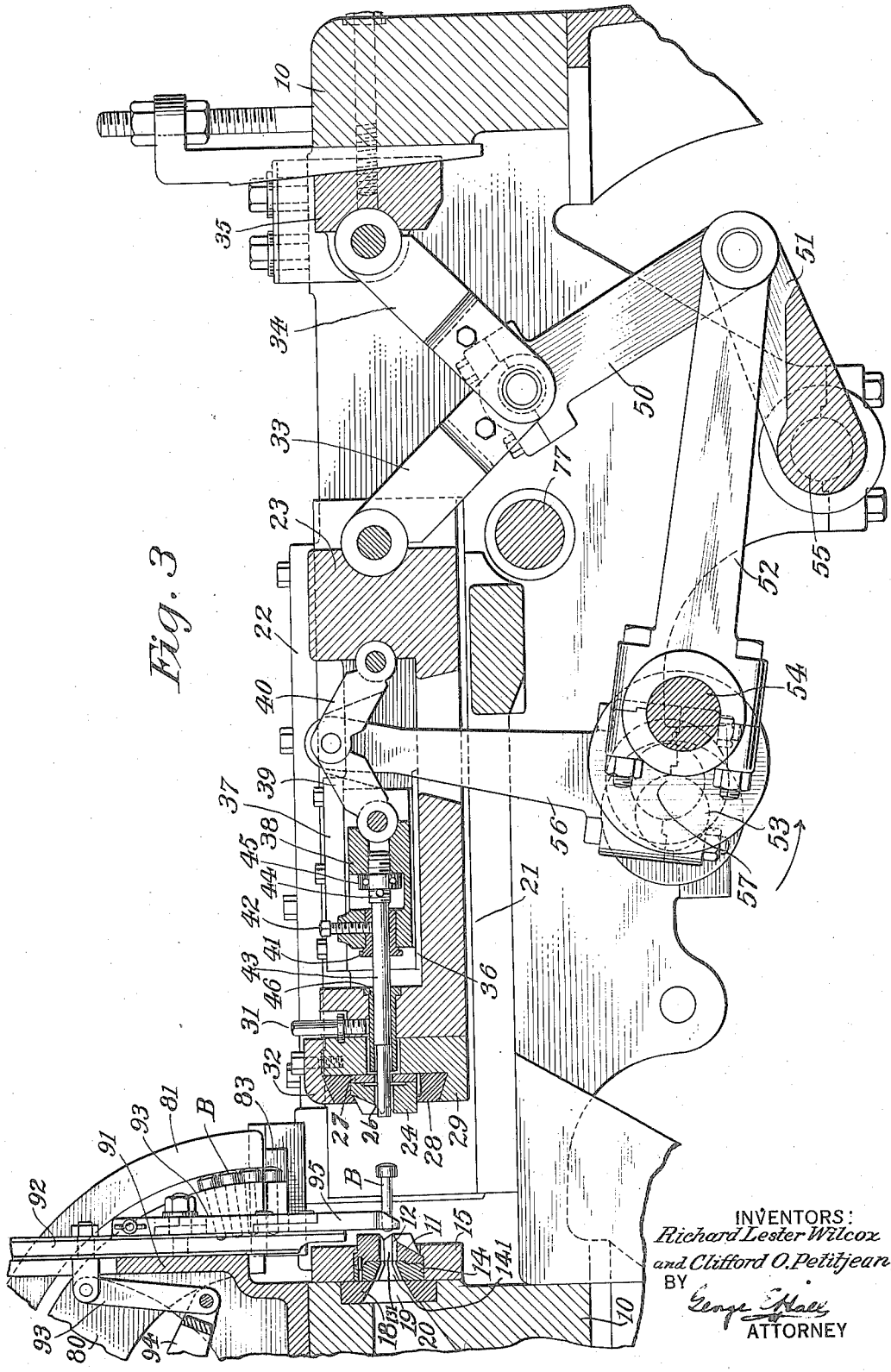

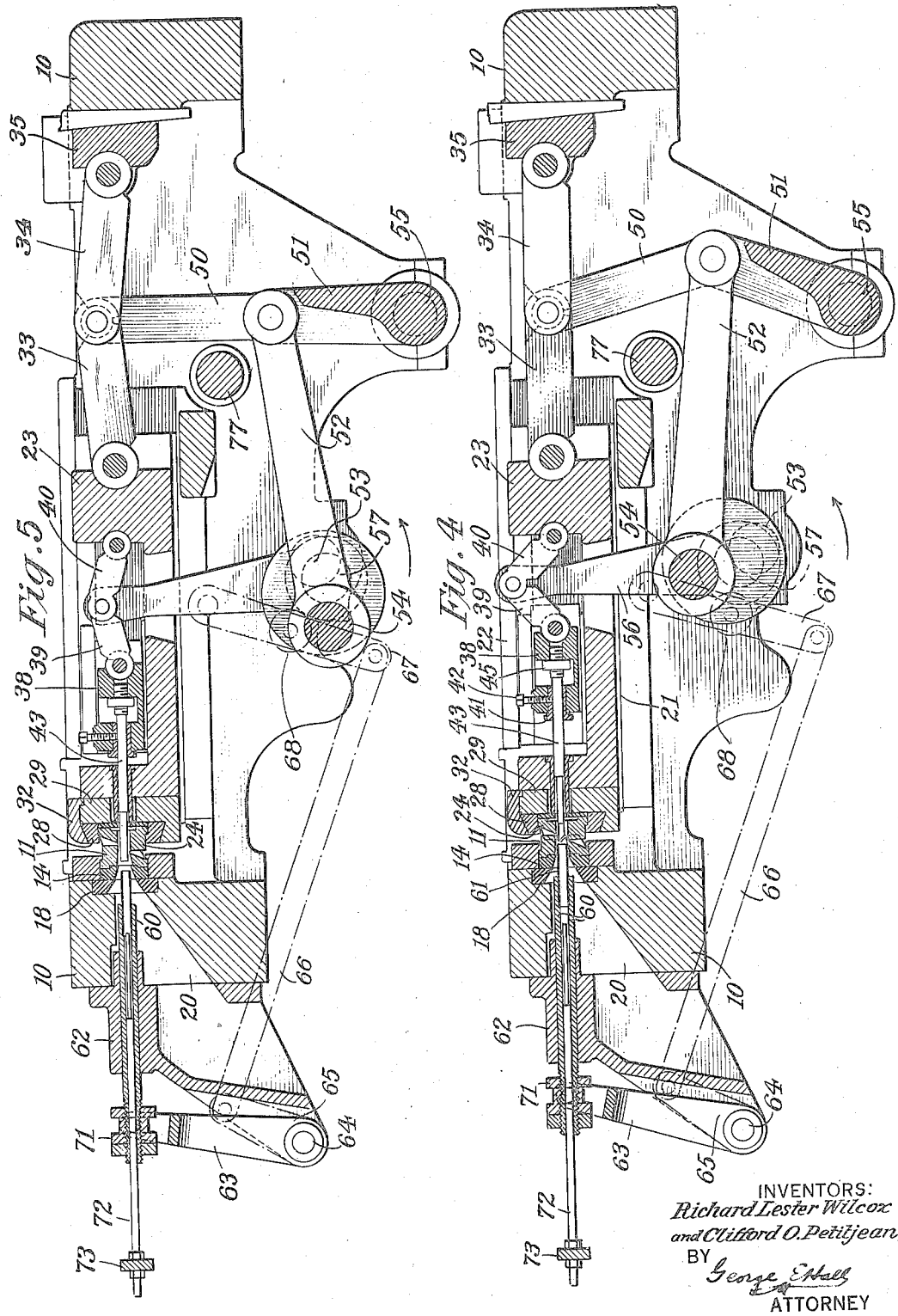

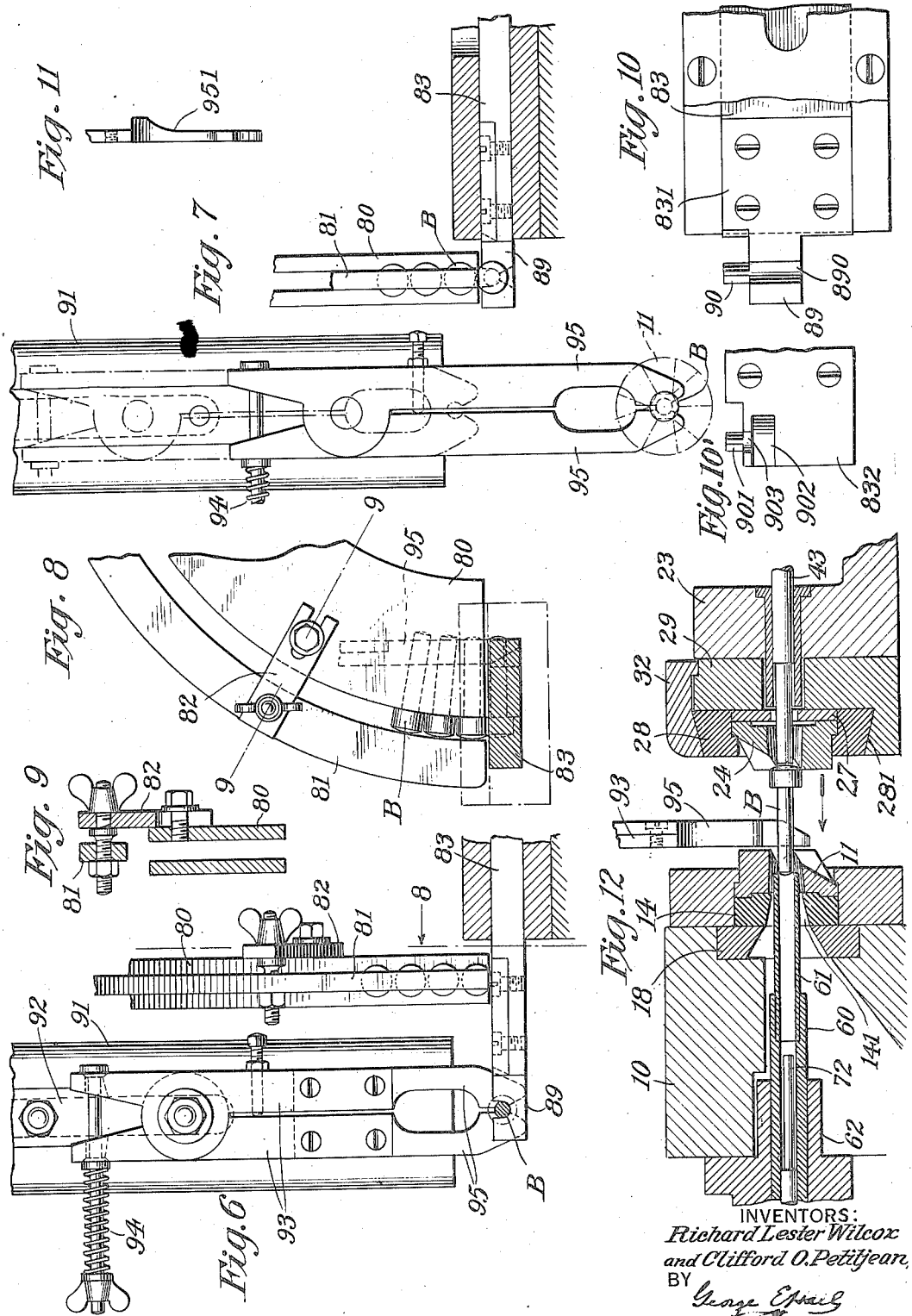

R. L. WILCOX & C. O. PETITJEAN.
MACHINE FOR TRIMMING BLANKS.
APPLICATION FILED MAR. 28, 1918.
1,294,993.
Patented Feb. 18, 1919.
6 SHEETS—SHEET 6.
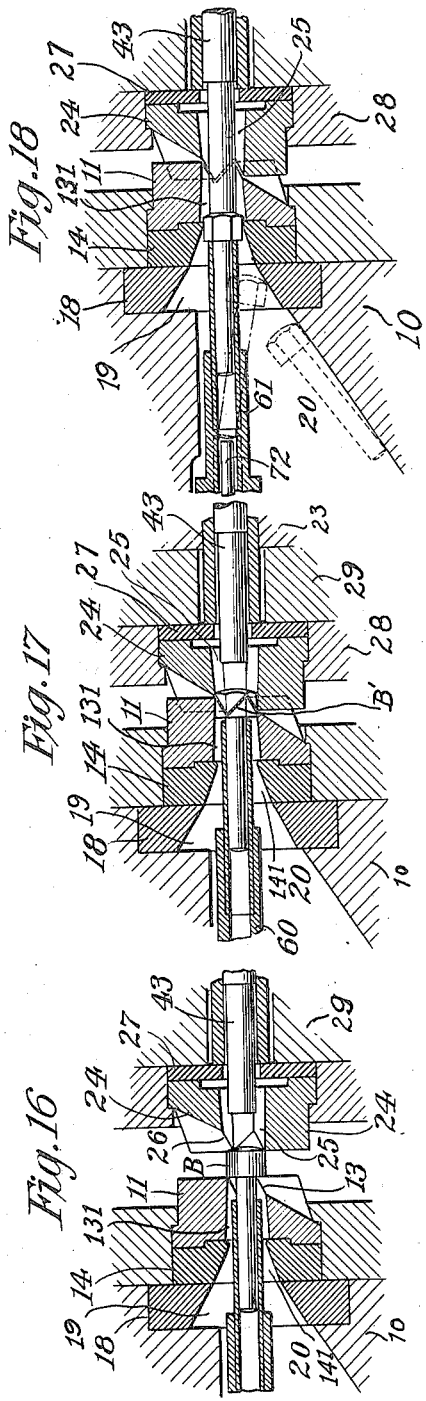
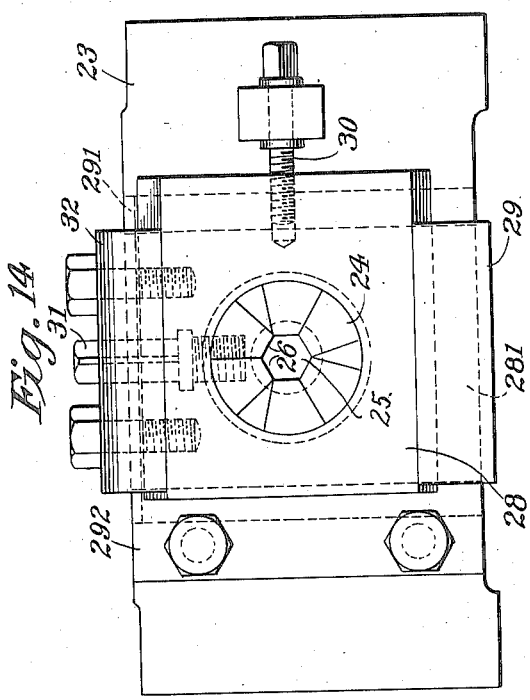
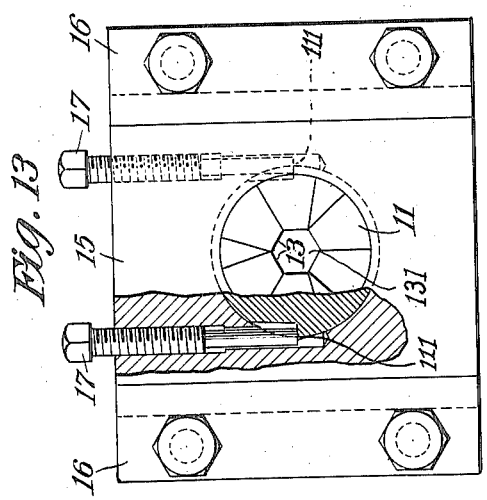
INVENTORS:
Richard Lester Wilcox
and Clifford O. Petitjean
BY George E Hall
ATTORNEY

UNITED STATES PATENT OFFICE.

RICHARD LESTER WILCOX AND CLIFFORD O. PETITJEAN, OF WATERBURY, CONNECTICUT, ASSIGNORS TO THE WATERBURY FARREL FOUNDRY AND MACHINE COMPANY, OF WATERBURY, CONNECTICUT, A CORPORATION OF CONNECTICUT.

MACHINE FOR TRIMMING BLANKS.

1,294,993.   Specification of Letters Patent.   Patented Feb. 18, 1919.

Application filed March 28, 1918. Serial No. 225,328.

*To all whom it may concern:*

Be it known that we, RICHARD LESTER WILCOX and CLIFFORD O. PETITJEAN, both citizens of the United States, and residents of Waterbury, county of New Haven, State of Connecticut, have invented certain new and useful Improvements in Machines for Trimming Blanks, of which the following is a specification.

Our invention relates to machines for trimming blanks and more especially to machines which will cut the blanks for bolts, nuts, screws or the like, so as to change either their shapes or sizes. Such machines have as one of their objects, among others, the cutting the square, hexagonal, octagonal or other shaped heads on bolts, the trimming and sizing of nut blanks, the cutting of two flat sides on a round head to form shackle bolts, the trimming of round screw heads to accurate size, and many other similar operations.

Herein we have used the term "polygon" or "polygonal" to mean any shape which has one or more flat sides, and it will be understood that by a "trimmed" section we mean any section, whether circular, polygonal or otherwise, which has been cut.

One of the objects of our invention is to provide a machine which will cut a blank quickly and efficiently without tearing the metal, so as to produce at a single operation, and in a minimum amount of time, a product with a superior finish to the cut surface. Heretofore such trimming operations have been usually carried out by passing the blank through a die having a suitably shaped opening therein in such a way that the cutting edges of the die enter the blank by cutting for a short distance and then, the resistance to the cutting pressure having been sufficiently decreased, the remaining metal is practically torn from the blank, leaving the faces of the blank rough and, in most cases, with depressions below what should be the level of the face. For some classes of work, the blanks thus formed are undesirable because of their unsightly and unfinished appearance.

Another object of our invention is to provide a means by which blanks may be trimmed automatically with a minimum amount of time, and with the least expenditure of energy, while at the same time, providing a product of superior quality and finish.

With these and other objects in view, our invention consists of certain novel features of construction, combination and arrangement of parts as will be more fully described and pointed out in the appended claims.

In the drawings, Figure 1 represents a side elevation of one form of a machine embodying our invention which we have chosen for purposes of illustration, some of the well known parts being omitted;

Fig. 2 is a plan view of the machine illustrated in Fig. 1;

Fig. 3 is a vertical section of a part of the machine illustrated in Figs. 1 and 2, taken along the line 3—3, which is the center line of operation of the machine;

Figs. 4 and 5 are similar to Fig. 3 but with some of the parts shown in different relative positions;

Figs. 6 and 7 show a portion of the blank feeding mechanism in two different positions;

Fig. 8 is a side view, looking in the direction of the arrow 8 of Fig. 6, of the end of the blank feeding chute;

Fig. 9 is a sectional view of the chute taken on the line 9—9 of Fig. 8;

Fig. 10 is a plan view of a portion of the blank feed cut off slide adapted for one kind of blank;

Figure 1:
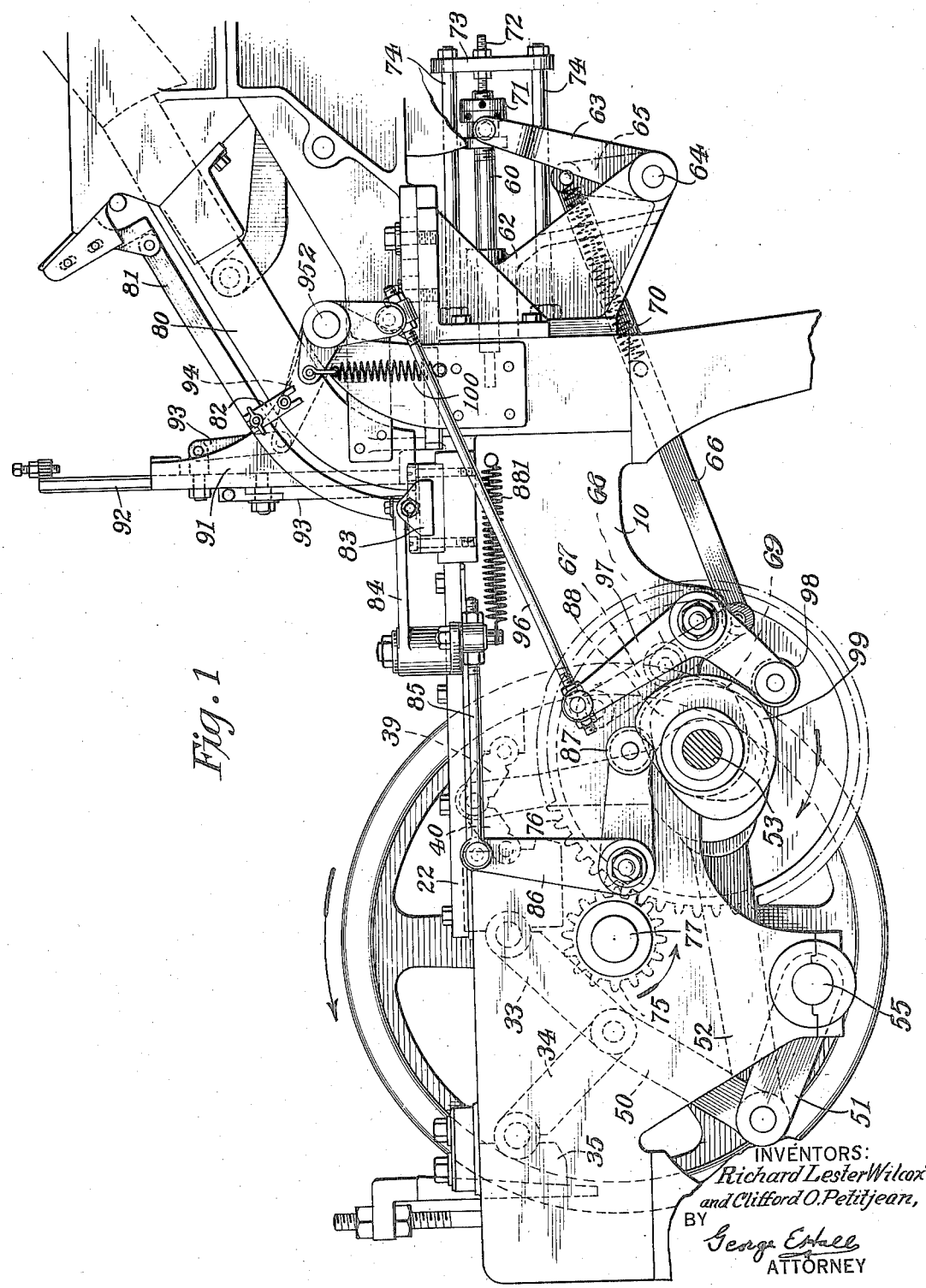

Fig. 10' is the same as Fig. 10, showing a modification;

Fig. 11 is a modification of the blank feeding fingers;

Fig. 12 is a partial section through the dies showing a portion of the blank feeding fingers;

Fig. 13 is a front view of the fixed die of the illustrated machine; and Fig. 14 is a front view of the movable die of the illustrated machine, these views showing the adjustments for the dies;

Fig. 15 is a detail of the blank feeding actuating mechanism;

Figs. 16, 17 and 18 are partial sections through the illustrative cutting tools or dies, showing successive steps in the forming of the head of a bolt blank, which operation has been adopted for purposes of illustration only.

The corresponding parts are referred to both in the drawings and the specification by similar reference characters.

In the machine which we have adopted for illustrative purposes, 10 is the frame. As shown at the left of Figs. 3, 4 and 5 particularly, a fixed die 11 is held against the inner wall of an opening in the frame 10. Inasmuch as the illustrated machine is shown as set up to trim a hexagon head on a bolt blank, (which will be understood to be only one of an innumerable number of uses to which our invention may be put), the die 11 is illustrated with a hexagonal opening 131 therethrough and with cutting edges 13 formed around this hexagonal opening (Figs. 3, 13 and 16). The die 11 is shown seated against a finishing tool 14 (in this instance, a planishing die) which will be described later, and the dies 11 and 14 are held in a holder 15 by gibs 16 to the frame 10. Preferably, and as illustrated, the die 11 has a circular exterior which fits into a circular opening in the holder 15. A shoulder (or shoulders) 111 is provided on either side of the die, as shown best in Fig. 13 and adjusting screws 17—17 contracting with these shoulders may be used to rotate the die in the holder 15 for a purpose to be pointed out hereinafter.

The finishing tool 14 has an opening 141 therethrough and the frame 10 is provided with a backing plate 18 having an opening 19 therethrough which communicates with an opening 20 through the frame 10.

Slidingly mounted on a slideway 21 of the frame 10 and held in place by gibs 22 is a main gate 23. On the front of this gate is mounted a cutting die 24, which also in the form illustrated, is provided with a hexagonal opening 25 therethrough and cutting edges 26 (Figs. 3 and 14). The die 24 rests against a backing plate 27 and is held in a holder 28 which is mounted for horizontal motion in a second holder 29, (Fig. 12) at the a V-shaped slideway 281 (Fig. 12) at the bottom of holder 29, and clamped therein by a clamping gib 32. The die 24 is fastened in slide 28 in any suitable manner. The horizontal motion of the holder 28 in relation to gate 23 may be controlled by an adjusting screw, as 30. The holder 29 is mounted for vertical motion on the end of the main gate 23, being held in a V-shaped slideway 291 (at the right of Fig. 14) by a clamping gib 292 (at the left of Fig. 14), and the vertical position of the holder 29 may be controlled by an adjusting screw, as 31. These adjusting devices are best shown in Fig. 14.

Between the main gate 23 and the rear of the frame 10 is a pair of toggle links 33, 34, the link 34 abutting against an adjustable abutment 35. This form of adjustment is well known and needs no further description. It will be obvious that, as the toggle formed of the links 33, 34 is made and broken, a reciprocatory movement is imparted to the main gate 23.

Mounted on slideways 36 in the gate 23 and held in place by gibs 37 is a secondary gate 38. Between the rear of the secondary gate 38 and a rear wall of the main gate 23 is a pair of toggle links 39, 40. It will be obvious that, as the toggle formed by these links is straightened and broken, the secondary gate 38 will reciprocate within the gate 23.

Carried within a bushing 41 and held by a screw 42 is a pusher rod 43, one end of which extends into the opening 25 of the die 24 and the other end of which bears against a threaded member 44, provided with an adjusting nut 45, the member 44 being threaded into, and nut 45 abutting against, a portion of the secondary gate 38. The end of the rod 43 projecting into the opening 23 slides through a bushing 46 carried by the main gate 23.

As operating means for the toggle 33, 34, we provide a connecting rod 50 which, with the link 51, constitutes a second toggle operated by a connecting rod 52, which connects to the main driving shaft 53 through a crank 54 formed thereon. The link 51 is mounted on bearings 55 supported in the frame 10.

The links 39, 40 are each connected to a connecting rod 56 which is also connected to the main driving shaft 53 through a crank 57 formed thereon. Inasmuch as so much of the mechanism which has been thus far described may be used to operate on any kind of a blank, we will now describe the operation of the parts without reference to the form of blank operated on or to the method of feeding it, the latter of which will be more fully described hereinafter.

Assuming now that a blank, as B, is placed between the dies 11 and 24 and in alinement with the openings therethrough, (Fig. 3) the rotation of the shaft 53 will first straighten the toggle formed by the links 50 and 51, which will, in turn, straighten the toggle formed by the links 33 and 34 to move the main gate 23 to the left of Figs. 3, 4 and 5. While this is taking place, the toggle 39, 40, since it is operated by the crank 57 on the main driving shaft 53, will also be moving but the cranks 57 and 54 are so positioned that the first effect, as the gate 23 moves forward, is to cause a motion of the pusher rod 43 to the right of Fig. 3 relatively to the gate 23 so that, when the die 24 contacts with the blank as shown in Fig. 12, the rod 43 will have been moved within the die 24. The die 24 carried by the main gate 23 contacts with the blank and forces it to the left of Figs. 3, 4 and 5 until it is held between the dies 11 and 24 as shown in Fig. 16. At this time the toggles formed by the links 51, 50 and 33, 34 are approaching their straightened positions so that the pressure available for cutting the blank is very great. Since the blank is held between a pair of dies, each die will cut into the blank for some distance until the dies reach the position shown in Figs. 4 and 17. In this position, the die 24 has moved to its extreme position to the left of Figs. 3, 4 and 5, and preferably this will be at a point just before the dies 11 and 24 meet, which will leave a small portion of uncut metal B′ around the blank, as shown best in Fig. 17.

During the forward motion of the gate 23, the toggle controlling the pusher rod 43, is operated in such a way that the rod 43 has been held behind the face of the die 24. But it will be seen by a comparison of Figs. 4 and 5 that further rotation of the main shaft 53 will now cause a quick straightening of the toggle 39, 40 and this will result in a rapid motion of the pusher rod 43 to the left of Fig. 4. The rod 43 contacts with the blank and pushes it through the die 11, as shown in Fig. 18. This results in trimming away the uncut portion B′ of the metal left by the dies 11 and 24.

Preferably, we arrange the toggle links 33 and 34 and their operating mechanism so that, just before the rod 43 contacts with the blank, the toggle 33, 34 is moved past the center or broken slightly to draw the gate 23 to the right of Fig. 3. This position of the toggle is shown in Fig. 5. This relieves the pressure on the metal left uncut by the dies 11 and 21, while the blank is being pushed through the die 11 by the rod 43 and gives space for the chip formed by the shaving operation resulting from forcing the blank through the die 11. Without this extra space, a new chip would be forced into the old chip which fills the space between the dies.

Obviously, the motions of the main gate 23 and the rod 43 could be obtained by many different mechanisms, and particularly by cams, but the toggles illustrated are especially adapted for that purpose and we have found that it is possible to give the desired motions to the toggles by cranks on a single crank shaft, which not only greatly reduces the number of parts, but also provides a very rigid construction.

If desired, the pusher or its equivalent may be dispensed with, even when the cutting is stopped before all of the metal is removed. The partly finished blanks could then be finished in the usual manner by a punch and die, to remove the remaining metal. But such second operation is preferably dispensed with by completing the finishing in our present machine, as we have described.

After the blank has been cut, it is obvious that it may be ejected from the die 11 by returning it in the opposite direction to that in which it entered the die, but preferably we arrange to push the blank entirely through the die and out of the machine in the same direction in which the blank is moved while being cut. It is also desirable to provide means to guide the blank in the cutting dies, and such means will vary, of course, according to the character of the blank being cut. For the particular blank B illustrated, which is a blank for a hexagonal bolt, such guiding means may be a sliding bushing 60 carrying a second bushing 61 provided with an opening of the diameter of the shank of the blank. As will be seen by an inspection of Figs. 12 and 16, the shank of the illustrated blank will be pushed into the bushing 61 which will both center it and support it. The bushing 60, carrying the auxiliary bushing 61, is slidingly mounted in a member 62 attached to the frame 10, and the bushing 60 is given a longitudinal motion by a link 63 pivoted at 64 and operated by a lever 65 through a link 66 connected to a cam lever 67, carrying a cam roller 68 connecting with a cam 69 on the main driving shaft 53. A spring 70 serves to hold the cam roller 68 against the cam 69 and to hold the bushing 61 yieldingly in the position shown in Figs. 4 and 16. Through the nut 71 threaded on the end of the bushing 60, the bushing 61 may be adjusted in its operative position within the die 11.

In the form in which we have illustrated the guide 61, it serves not only as a guiding and centering device for the blank, but also as a carrier to aid in removing the finished blank for the machine, and in order to eject the finished blank from this guide when the latter is carried to the left of Fig. 4, a suitable ejecting device should be provided. As one form of such device, we provide the fixed stripper rod 72, one end of which is held within the bushing 60 and the opposite end held adjustably in a support 73 attached through the rods 74 to the frame 10.

When the blank is passed through the die 11, the bushing 61 carries it to the left of Fig. 4, until the end of the blank contacts with the stripper rod 72. Further motion of the bushing 61 removes the support for the blanks when it will drop into the opening 20, from which it will fall into any suitable receptable. This is illustrated best in Fig. 18.

The main shaft 53 is driven through gears 75, 76 from the fly wheel shaft 77 supported in the frame 10.

Preferably we provide an automatic feed for the blanks which, in the form illustrated, is in many respects of a known type, and we have illustrated such a device as arranged to feed blanks of the type shown by B. It will be understood, of course, that the automatic feed will be varied in accordance with the character of the blanks to be fed. In the form which we have illustrated the headed blanks B alide in the feed chute 80, the heads being held by an adjustable cover 81, the adjustment being provided by the slotted member 82. The blanks are arranged in this chute by any suitable hopper arrangement which is well known, and which it is unnecessary to illustrate. A feed or cut-off transfer slide 83 is reciprocated by a lever 84 operated through link 85 by a cam lever 86 carrying a cam roller 87 bearing against a cam 88 on the end of the main driving shaft 53. A spring 881 holds the roller 87 against cam 88. As shown best in Fig. 10, the end of the slide 83 is provided with a detachable piece 831 having a projection 89 provided with a suitable recess 890 shaped to conform to the shank of the blank B and having a projection 90 continuing this recess 890 beyond the projection 89. The slide 83 is moved so that this recess 890 is carried from beneath the end of the chute 80 to the vertical plane of the center line of the cutting dies, as shown in Figs. 6 and 7.

In this vertical plane and above the dies is fastened a frame 91 on which is mounted a slide 92 carrying a pair of feed tongs comprising finger levers 93—93 yieldingly held together by a spring 94. To the lower ends of the finger levers 93—93, are removably attached a pair of fingers 95—95, which are shaped so that, when they are in the closed position shown in Fig. 6, they will extend around the shank of the blank B, adjacent the extension 90 on the cut-off transfer slide 83. Reciprocating motion is given to the slide 92 by the link 93 connected to the lever 94 pivoted at 952 and connected by link 96 with the cam lever 97 carrying a cam roller 98 bearing against the cam 99. A spring 100 serves to hold the cam roller 98 against its cam.

As the cut-off transfer slide 83 moves from its position shown in Fig. 7 with its end beneath the chute 80, it carries the lowermost blank B from the chute 80 into the line of operation of the transfer tongs 93, which at this time are raised to the dotted line position shown in Fig. 7. The body portion of the slide 83 serves to cut off the remainder of the blanks B in the chute 80, the lowermost one of which rests upon it. When the slide 83 is beneath the transfer tongs, as shown in Fig. 6, the fingers 95 descend, and, because of their yielding connection, pass around the blank and hold it, as shown in Fig. 6. Then the fingers 95 are raised somewhat to lift the blank from the slide 83 and the latter returns to the position shown in Fig. 7. Thereupon the fingers 95 are carried downwardly to bring the blank into alinement with the cutting dies and to hold it until the blank has been moved through the fingers 95—95 by the dies, after which the fingers 95—95 again move upwardly, leaving the blank B in die 11.

We have found it desirable to arrange the fingers 95—95 so that, when a relatively long blank, such as B, is operated upon, these blank holders will have considerable width, as shown in Fig. 12. This is in order to provide as extended a hold on the blank as possible to prevent the blank from tilting in the fingers. It is possible to use this width of holder, because, the shank being long, a considerable portion thereof will be moved into the bushing 61 before the dies 11 and 24 come very close together. On the other hand, if the blank B has a very short shank, it will be obvious that, if the fingers 95 are as wide relatively as shown in Fig. 12, there is a possibility that the shank of the blank will not enter the bushing 61 before it is necessary to move the fingers 95 to prevent their being caught between the dies. For that and other reasons, we make the fingers 95 detachable from the finger levers 93 so that, when short blanks are used, relatively thin fingers may be substituted. Such a thin finger is shown in Fig. 11 at 951. This width is enough to hold short blanks without danger of tilting in the fingers. With such a relatively thin fingers, fingers 95 may be held in their downmost position shown in Fig. 7 up to a later point in the cycle of operations than is possible with the relatively wide finger 95. We provide for this difference by a simple arrangement which enables the operator of the machine to adjust it for these two different timings of the motion of the fingers. For this purpose, we mount the cam 99 on the hub of a wheel 101 (used for a purpose not necessary to describe in connection with our present invention) and we drive this wheel 101 and with it the cam 99 from a key 102 in the driving shaft 53 through a sleeve 103. This sleeve 103, as shown in detail in Fig. 15, is provided on each side with a pair of transverse slots, the slots on one side being marked 104, 105 and on the opposite side, 106, 107. On the hub of the wheel 101 is formed a tongue 531 adapted to engage in one of the slots 105 or 106. The key 102 will engage one of the slots 104 or 107. It will be noted that the angle which slot 107 makes with slots 105—106 is different from the angle made by slot 104 with slots 105—106.

The timing of the motion of the fingers 95 in relation to the cycle of the machine will be changed if the cam 99 is shifted on the shaft 53 while the other parts are stationary, and the sleeve 103 provides an easy method to accomplish this end. Supposing that, as shown in Fig. 2, the sleeve 103 is placed between the key 102 and the hub of the wheel 101, so that the operating portion of the cam 99 is adjusted to move the wide fingers 95 in proper relation to the cycle so as to prevent these wide fingers being caught between dies 11 and 24, then the cam 99 may be shifted to bring its operative part in correct relation with the cycle for the narrow fingers 951 by removing the key 102, taking off the sleeve 103, turning the sleeve 103 around so as to bring the opposite face against the hub of the wheel 101 and then turning the wheel 101, and with it the cam 99 until the tongue 531 on the hub 101 and the key 102 will enter the slots now presented to each of them respectively. Because of the difference in the relation of the two slots on opposite sides of the sleeve 103, the cam 99 will now be held in its new position. While, of course, the cam 99 can be shifted on the shaft 53 in any one of the well known manners, such adjustments usually involve considerable shifting on the part of the operator before the desired new position is reached. With the simple means which we have illustrated, the two operating positions of the cam can be obtained without care on the part of the operator.

Preferably, when short blanks are used, we provide a special support on the end of slide 83. In Fig. 10′, we have illustrated such a modification, plate 832 having been substituted for plate 831 in Fig. 10. The extension 901 is shorter than extension 90 and plate 832 is recessed at 902 for the head of the short blank and at 903 for the shank of the short blank.

The dies 11 and 24 which we have chosen for purposes of illustration are of the solid type and preferably have their respective cutting edges 13 and 26 formed by angular cuts across the face of the die so that, preferably, these cutting edges have an angular relation to the direction of motion of the dies. Preferably, the dies are similar, so far as the arrangement of their cutting edges are concerned, and preferably they are arranged so that the cutting edge of one die is directly opposed and in alinement with a similar cutting edge of the other die. For instance, as shown best in Figs. 13 and 14, if the dies are arranged for cutting a hexagon blank, the cutting edges in each die will, of course, be arranged accordingly as hexagons around the center of the blank, and preferably so that each cutting edge of one die will be in substantially the same plane with the corresponding cutting edge of the opposite die. In order to bring about this arrangement, as well as to aline the dies so that they will have a common axis, the adjustments heretofore described and especially illustrated in Figs. 13 and 14, are desirable. By the adjustments shown in Fig. 14, the die 24 can be shifted vertically and horizontally until its axis corresponds to the axis of the die 11 and the die 11 may be rotated on this axis by screws 17 until its cutting edges are in substantially the same plane as the cutting edges of die 24.

Preferably, in order to secure the best finish to the product, the cutting edges of the die 24 are arranged so that they are somewhat farther from the axis of the die than the corresponding edges of the die 11. Then, when the blank is cut between such a pair of dies, a small amount of metal is left on each face by the die 24 and this amount of metal is cut off as the blank is pushed through the die 11 by the punch 43.

It will be understood that the adjustments for the rod 43 and for the bushing 61 and the stripper rod 72 are provided to adapt the machine for varying sizes of blanks.

While not essential, we prefer to provide a finishing tool 14 directly behind the cutting die 11. This finishing tool may be any device to finish the cut surfaces, such as a die arranged to take a light cut over the surfaces or a planishing die arranged to smooth or iron the surface. The latter is the form we have illustrated. This planishing die 14 in the form illustrated is provided with an opening 141 similar to the opening in the die 11 but with planishing surfaces slightly nearer the axis of the blank than are the cutting edges. When such an arrangement is used, the rod 43 not only pushes the blank through the die 11 but also through the planishing die 14 and the planishing surfaces of this die smooth or iron out the freshly cut surfaces to remove any tool marks or the like left by the cutting dies.

It will be understood that our illustrated mechanism may be varied within wide limits without departure from our invention. The blank guide and stripping device may be varied within wide limits and indeed for some types of blanks, may be entirely dispensed with. Particularly, such devices may be arranged so that the finished blank may be ejected into the space between the dies and in such case the bushing 61 or its equivalent would be moved to the right of Fig. 4 to push out the finished blank.

While we have used solid dies for purposes of illustration of our preferred form of cutting tools, it will be obvious that the cutting tools used may be varied within wide limits. For some purposes, such tools may be any of the forms of tools ordinarily used in cutting metals, such as the ordinary planer tools, used either singly or in groups forming a circle or polygon with their cutting edges, or dies may be used, either of the solid type, as illustrated, or with separate cutters. In carrying out our preferred form of invention, when two opposed cutting tools are used, the cutting edges on the tools will be arranged so that each point of one edge will have a corresponding joint on the opposing edge at approximately the same distance from the axis of the blanks, so that the opposed cutting edge will be in substantial alinement with each other in the direction of motion of the tools while cutting the blanks. Such alinement enables the opposed cutting edges to cut similar shapes on the blanks, even though such edges may not be parallel to each other. Thus, such opposed edges will be in substantial alinement even though one of them may be in a plane at right angles to the direction of motion of the tools and the other in a plane making a smaller angle with such direction. We refer herein to the opposed cutting edges being in substantial alinement for of course, when that form of our invention is used in which the blanks cut by one tool is slightly larger than the blanks cut by the opposing tool, the opposed edges can not be in actual alinement, for one of them will be at a slightly greater distance from the center of the blank than the other edge. Nevertheless, since this difference in distance will seldom be very great, the opposed edges will be in substantial alinement. Thus, in the form illustrated, the cutting edges for one side of the hexagon on one die will be in one plane parallel to the axis of the dies, while the opposed edge will be in a parallel plane at a greater distance from the axis of the die. But we refer to such two edges as being in substantial alinement.

Preferably, we arrange the cutting edges so that they are in planes making angles with the direction of motion of the tools, so as to throw the chips to one side as the cutting takes place, but this is not essential. For instance, instead of the dies which we have illustrated and which have their edges angularly disposed to the direction of motion, we may use for some purposes, dies in which the cutting edges are all in a common plane at right angles to the direction of motion. And, although preferably we make out cutting edges so that opposed portions have the same slope in reference to the direction of motion of the tools, as we have illustrated, this is not essential. For instance, the edge on one tool may be in a plane making an angle of 20 degrees with the direction of motion and the opposing edge on the other tool may make an angle of only 10 degrees.

It will also be understood that, if desired, either one of the cutting tools may be fixed and the other movable and that when, in this specification and the appended claims, we refer to moving the tools toward each other or the motion of the tools, we mean any relative movement of the tools which causes them to approach each other, whether one is stationary and the other movable, or both are movable.

We claim:

1. In a machine of the class described, a pair of cutting tools with their cutting portions facing each other, the tools being relatively movable toward and away from each other, tool moving means to cause the tools to cut a blank placed between them and to stop the cutting before the opposing cutting edges meet, and means to move the blank past one of the cutting tools.

2. In a machine of the class described, a pair of cutting tools with their cutting portions facing each other, the tools being relatively movable toward and away from each other, a finishing tool in the rear of one of the cutting tools, tool moving means to cause the tools to cut a blank placed between them and to stop the cutting before the opposing cutting edges meet, and means to move the blank past that cutting tool having the finishing tool at its rear and past the finishing tool.

3. In a machine of the class described, a pair of oppositely disposed dies, each having an opening with cutting edges around it, one of the openings extending through its die, the dies being arranged with the axes of their openings in alinement, and being mounted for relative movement toward and away from each other, die moving means for the dies and means to move a blank through the opening in one of the dies after the dies have engaged the blank.

4. In a machine of the class described, a pair of oppositely disposed dies, each having a central opening therethrough with cutting edges around it, the dies being arranged with the axes of their openings in alinement and being mounted for relative movement toward and away from each other, die moving means to cause the dies to cut a blank placed therebetween and to stop such cutting before the dies meet and means to move the blank through the opening in one of the dies.

5. In a machine of the class described, a pair of oppositely disposed dies, each having a central opening therethrough with cutting edges around it, the dies being arranged with the axes of their openings in alinement and being mounted for relative movement toward and away from each other, die moving means to cause the dies to cut a blank placed therebetween and to stop such cutting before the dies meet and a pusher movable through the opening in one die to move the blank through the opening in the other die.

6. In a machine of the class described, a pair of oppositely disposed dies, each having a central opening therethrough with cutting edges around it, the dies being arranged with the axes of their openings in alinement and being mounted for relative movement toward and away from each other, die moving means to cause the dies to cut a blank placed therebetween and to stop such cutting before the dies meet and then move them slightly apart and means to move the blank through the opening in one of the dies.

7. In a machine of the class described, a pair of oppositely disposed dies, each having an opening with cutting edges around it, die moving means for the dies and means to move the blank past the cutting edges of the first die, the cutting edges of the first die being substantially in alinement in the direction of motion of the dies with the cutting edges of the second die and nearer the axis of the opening than the cutting edges of the second die.

8. In a machine of the class described, a pair of oppositely disposed dies, each having an opening therethrough with cutting edges around it and the axes of the openings in alinement, die moving means for the dies, and a pusher movable through the opening in the first die to move the blank through the opening in the second die, the cutting edge of the second die being substantially in alinement in the direction of motion of the dies with the cutting edges of the first die and nearer the common axis of the openings than the cutting edges of the first die.

9. In a machine of the class described, a pair of oppositely disposed dies, each having a central opening therethrough with cutting edges around it, the dies being arranged with the axes of their openings in alinement and being mounted for relative movement toward and away from each other, die moving means to cause the dies to cut a blank placed therebetween and to stop such cutting before the dies meet and then move them slightly apart and a pusher movable through the opening in one of the dies after they have been so drawn apart, to move the blank through the opening in the other die.

10. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and to stop the cutting before the dies reach each other and means to continue the motion of the blank through one of the dies.

11. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and means to move the blank through one of the dies.

12. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and to stop the cutting before the dies reach each other, the polygon of one of the dies being slightly larger than the polygon of the other die, and means to continue the motion of the blank through the die having the smaller polygon.

13. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and to stop the cutting before the dies reach each other and then moving the dies apart a short distance, and means to continue the motion of the blank through one of the dies.

14. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and to stop the cutting before the dies reach each other and then moving the dies apart a short distance, the polygon of one of the dies being slightly larger than the polygon of the other die, and means to continue the motion of the blank through the die having the smaller polygon.

15. In a machine of the class described, a pair of relatively movable dies having a common axis and each provided with a set of cutting edges arranged around the axis to form a polygon, the polygons formed by each set being similar with their sides substantially in alinement in the direction of motion of the dies, and a finishing tool at the rear of one of the dies constructed and arranged to finish the faces of the blank produced by the dies, die moving means to cause the dies to cut a blank placed therebetween and means to continue the motion of the blank through one of the dies and past the finishing tool.

16. In a machine of the class described, a pair of relatively movable dies having a common axis and each provided with a set of cutting edges arranged around the axis to form a polygon, the polygons formed by each set being similar with their sides substantially in alinement in the direction of motion of the dies, and a pusher moving through one of the dies to move the blank through the other die after the blank has been engaged by both dies.

17. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and to stop the cutting before the dies reach each other and a pusher moving through one of the dies to move the blank through the other die after the cutting movement of the dies has been stopped.

18. In a machine of the class described, a pair of relatively movable dies having a common axis and each provided with a set of cutting edges arranged around the axis to form a polygon, the polygons formed by each set being similar with their sides substantially in alinement in the direction of motion of the dies, die moving means to cause the dies to cut a blank placed therebetween and to stop the cutting before the dies reach each other and then moving the dies apart a short distance, and a pusher moving through one of the dies to move the blank through the other die after the dies have been moved apart.

19. In a machine of the class described, a pair of relatively movable dies, having a common axis and each provided with a set of cutting edges arranged around the axis to form a polygon, the polygons formed by each set being similar with their sides substantially in alinement in the direction of motion of the dies, and die moving means to cause the dies to cut a blank placed therebetween, the cutting edges of the pair of dies being arranged angularly to the direction of the axis.

20. In a machine of the class described, a pair of relatively movable dies having a common axis and each provided with a set of cutting edges arranged around the axis to form a polygon, the polygons formed by each set being similar with their sides substantially in alinement in the direction of motion of the dies, and die moving means to cause the dies to cut a blank placed therebetween, the cutting edges of the pair of dies being arranged angularly to the direction of the axis and with each cutting edge of one die substantially parallel to the opposing cutting edge of the other die.

21. In a machine of the class described, a pair of relatively movable dies having cutting edges, the dies being constructed and arranged so that the cutting edges of the dies are similarly disposed around the axis of each die, a support for each of the dies, adjusting means on the supports constructed and arranged to permit the dies to be moved relatively in planes at right angles to the direction of motion of the dies to bring the opposed cutting edges of the dies into substantial alinement with each other, and die moving means for the dies.

22. In a machine of the class described, a pair of relatively movable dies having cutting edges, the dies being constructed and arranged so that the cutting edges of the dies are similarly disposed around the axis of each die, a support for each of the dies, adjusting means on the supports constructed and arranged to permit the dies to be moved relatively in their supports to bring the opposed cutting edges of the dies into substantial alinement with each other, and die moving means for the dies.

23. In a machine of the class described, a pair of relatively movable dies having a common axis and each provided with a set of cutting edges arranged around the axis to form a polygon, the polygons formed by each set being similar, a support for each of the dies, adjusting means on the supports constructed and arranged to permit the dies to be moved relatively crosswise and around the axis to bring the corresponding sides of the polygons into alinement and the centers of the polygons into the common axis and die moving means to cause the dies to cut a blank placed therebetween.

24. In a machine of the class described, a pair of relatively movable dies having a common axis and each provided with a set of cutting edges arranged around the axis to form a polygon and an opening through each die bounded by the polygon, the polygons formed by each set of cutting edges being similar, die moving means to cause the dies to cut a blank placed therebetween, a blank holder movable through the opening of one of the dies and adapted to receive the blank as it passes into the die, and means to move the blank through the die provided with the blank holder.

25. In a machine of the class described, a pair of relatively movable dies having a common axis and each provided with a set of cutting edges arranged around the axis to form a polygon and an opening through each die bounded by the polygon, the polygons formed by each set of cutting edges being similar, die moving means to cause the dies to cut a blank placed therebetween, a blank holder movable through the opening of one of the dies and adapted to receive the blank as it passes into the die and a pusher movable through the opening in the other die to move the blank through the die provided with the blank holder.

26. In a machine of the class described, a pair of relatively movable dies having a common axis and each provided with a set of cutting edges arranged around the axis to form a polygon and an opening through each die bounded by the polygon, the polygons formed by each set of cutting edges being similar, die moving means to cause the dies to cut a blank placed therebetween, a blank holder movable through the opening of one of the dies and adapted to receive the blank as it passes into the die, means to move the blank through the die provided with the blank holder and means to move the blank holder to carry the blank away from the blank moving means.

27. In a machine of the class described, a pair of relatively movable dies having a common axis and each provided with a set of cutting edges arranged around the axis to form a polygon and an opening through each die bounded by the polygon, the polygons formed by each set of cutting edges being similar, die moving means to cause the dies to cut a blank placed therebetween, a blank holder movable through the opening of one of the dies and adapted to receive the blank as it passes into the die, means to move the blank through the die provided with the blank holder, means to move the blank holder to carry the blank away from the blank moving means and means to eject the blank from the blank holder.

28. In a machine of the class described, a pair of relatively movable oppositely disposed cutting tools, a gate supporting one of the tools, means to reciprocate the gate to move the tool carried thereby, a pusher on the gate and movable relatively thereto toward and away from the other tool, and means to reciprocate the pusher independently of the motion of the gate.

29. In a machine of the class described, a pair of relatively movable oppositely disposed cutting tools, a movable gate supporting one of the tools, a pusher on the gate and movable relatively thereto, means to move the gate toward and then away from the other tool and means to move the pusher toward the other tool when the gate begins to move away from the other tool.

30. In a machine of the class described, a pair of relatively movable oppositely disposed cutting tools, a movable gate supporting one of the tools, a pusher on the gate and movable relatively thereto, means to move the gate toward and away from the other tool, and means to move the pusher toward the other tool independently of the motion of the gate.

31. In a machine of the class described, a pair of relatively movable oppositely disposed cutting tools, a movable gate supporting one of the tools, a pusher on the gate and movable relatively thereto, means to reciprocate the gate toward and away from the other tool, a toggle device on the gate connected to the pusher, and means to move the toggle to move the pusher on the gate toward the other tool.

32. In a machine of the class described, a pair of relatively movable oppositely disposed cutting tools, a movable gate supporting one of the tools, a pusher on the gate and movable relatively thereto, a toggle device to reciprocate the gate toward and away from the other tool, a toggle device on the gate connected to the pusher, a driving shaft, a crank on the shaft connected to the gate moving toggle, a crank on the shaft connected to the pusher moving toggle, said cranks being arranged relatively so as to move the pusher toward the other tool after the gate has commenced to move away from the other tool.

33. In a machine of the class described, a pair of relatively movable oppositely disposed cutting tools, a movable gate supporting one of the tools, a pusher on the gate and movable relatively thereto, a toggle device to reciprocate the gate toward and away from the other tool, a toggle device on the gate connected to the pusher, a driving shaft, a crank on the shaft connected to the gate moving toggle, a crank on the shaft connected to the pusher moving toggle, said cranks being arranged relatively so as to move the pusher toward the other tool after the gate has moved toward the other tool.

34. In a machine of the class described, a pair of relatively movable oppositely disposed cutting tools, a movable gate supporting one of the tools, a pusher on the gate and movable relatively thereto, means to reciprocate the gate toward and away from the other tool, a toggle device on the gate connected to the pusher, means to move the toggle to move the pusher on the gate toward the other tool, a blank holder adjacent the other tool and means to move the blank holder away from the other tool as the pusher moves toward it.

35. In a machine of the class described, a pair of relatively movable oppositely disposed cutting tools, blank holding means to hold a blank between the tools, tool moving means, a blank holder adjacent one of the tools, the blank holding means being constructed and arranged to engage the blank until the blank is moved into engagement with the blank holder by the other of the tools.

36. In a machine of the class described, a pair of relatively movable oppositely disposed cutting tools, fingers arranged to hold a blank between the tools, tool moving means, a blank holder adjacent one of the tools, the fingers being arranged to hold the blank until the other of the tools moves the blank into the blank holder and means to move the fingers away from the blank after the blank is engaged by the blank holder.

37. In a machine of the class described, a pair of relatively movable oppositely disposed cutting tools, means to move the tools toward each other, fingers arranged to hold a blank between the tools, a blank holder adjacent one of the tools, the fingers being constructed and arranged to hold the blank while the other tool moves the blank into the blank holder, supports for the fingers, the fingers being detachably connected to the supports, whereby the width of the fingers may be changed according to the length of the blank to be operated on, means to move the fingers away from the blank to escape contact with the tools and means whereby the time of beginning of movement of the fingers relative to the movement of the tools may be changed to agree with the width of fingers used.

38. In a machine of the class described, a pair of relatively movable oppositely disposed cutting tools, means to move the tools toward each other, fingers arranged to hold a blank between the tools, a blank holder adjacent one of the tools, the fingers being constructed and arranged to hold the blank while the other tool moves the blank into the blank holder, supports for the fingers, the fingers being detachably connected to the supports, whereby the width of the fingers may be changed according to the length of the blank to be operated on, means, including a cam, to move the fingers away from the blank to escape contact with the tools, and means whereby the operative position of the cam in relation to the tool moving means may be changed to agree with the width of fingers used.

39. In a machine of the class described, a pair of relatively movable oppositely disposed cutting tools, means to move the tools toward each other, fingers arranged to hold a blank between the tools, a blank holder adjacent the tools, the fingers being constructed and arranged to hold the blank while the other tool moves the blank into the blank holder, supports for the fingers, the fingers being detachably connected to the supports, whereby the width of the fingers may be changed according to the length of the blank to be operated on, means, including a cam, to move the fingers away from the blank to escape contact with the tools, a shaft connected to the tool moving means, the cam being loosely mounted on the shaft, a member connected to the shaft, and a collar between the member and the cam, the cam and the member each having a tongue and slot connection with the collar, the cam, member and collar being constructed and arranged to connect the cam to the shaft in different positions, relative to the tool moving means, according to which side of the collar is next to the member.

40. In a machine of the class described, a cutting tool, means to move a blank against the cutting tool, fingers arranged to hold a blank in front of the tool, supports for the fingers, the fingers being detachably connected to the supports, whereby the width of the fingers may be changed according to the length of the blank to be operated on, means, including a cam, to move the fingers away from the blank to escape contact with the blank moving means, a shaft connected to the blank moving means, the cam being loosely mounted on the shaft, a member connected to the shaft, and a collar between the member and the cam, the cam and the member each having a tongue and slot connection with the collar, the cam, member and collar being constructed and arranged to connect the cam to the shaft in different positions, relative to the blank moving means, according to which side of the collar is next to the member.

41. In a machine of the class described, a die having an opening therethrough, means to move a blank through the opening, a movable blank holder within the opening and adapted to receive the blank, means to move the blank holder out of the opening to carry the blank from the opening and means to release the blank from the blank holder after the blank is out of the opening.

42. In a machine of the class described, a die having an opening therethrough, means to move a blank through the opening, a movable bushing within the opening and adapted to receive the blank, means to move the bushing out of the opening to carry the blank from the opening and a fixed stripper constructed and arranged to eject the blank from the bushing as the bushing moves.

43. In a machine of the class described, a die having an opening therethrough, means to move a blank through the opening, a movable bushing within the opening and adapted to receive the blank, means whereby the position of the bushing may be adjusted toward and away from the dies, means to move the bushing out of the opening to carry the blank from the opening and a fixed stripper constructed and arranged to eject the blank from the bushing as the bushing moves.

44. In a machine of the class described, a pair of relatively movable oppositely disposed dies, each having an opening with cutting edges around the periphery thereof, each of the openings being substantially the shape of the finished cross section of the blank, die moving means to cause the dies to cut a blank from either end while the blank is stationary, and means to move the blank axially through one of the dies.

45. In a machine of the class described, a pair of relatively movable oppositely disposed dies, each having an opening with cutting edges around the periphery thereof, each of the openings being substantially the shape of the finished cross section of the blank, die moving means to cause the dies to cut a blank while the blank is stationary and to stop the cutting before the dies meet, and means to move the blank axially through one of the dies.

RICHARD LESTER WILCOX.
CLIFFORD O. PETITJEAN.